March 3, 1931.    A. H. LEIPERT    1,794,780
SPRING SUSPENSION
Filed Nov. 3, 1927
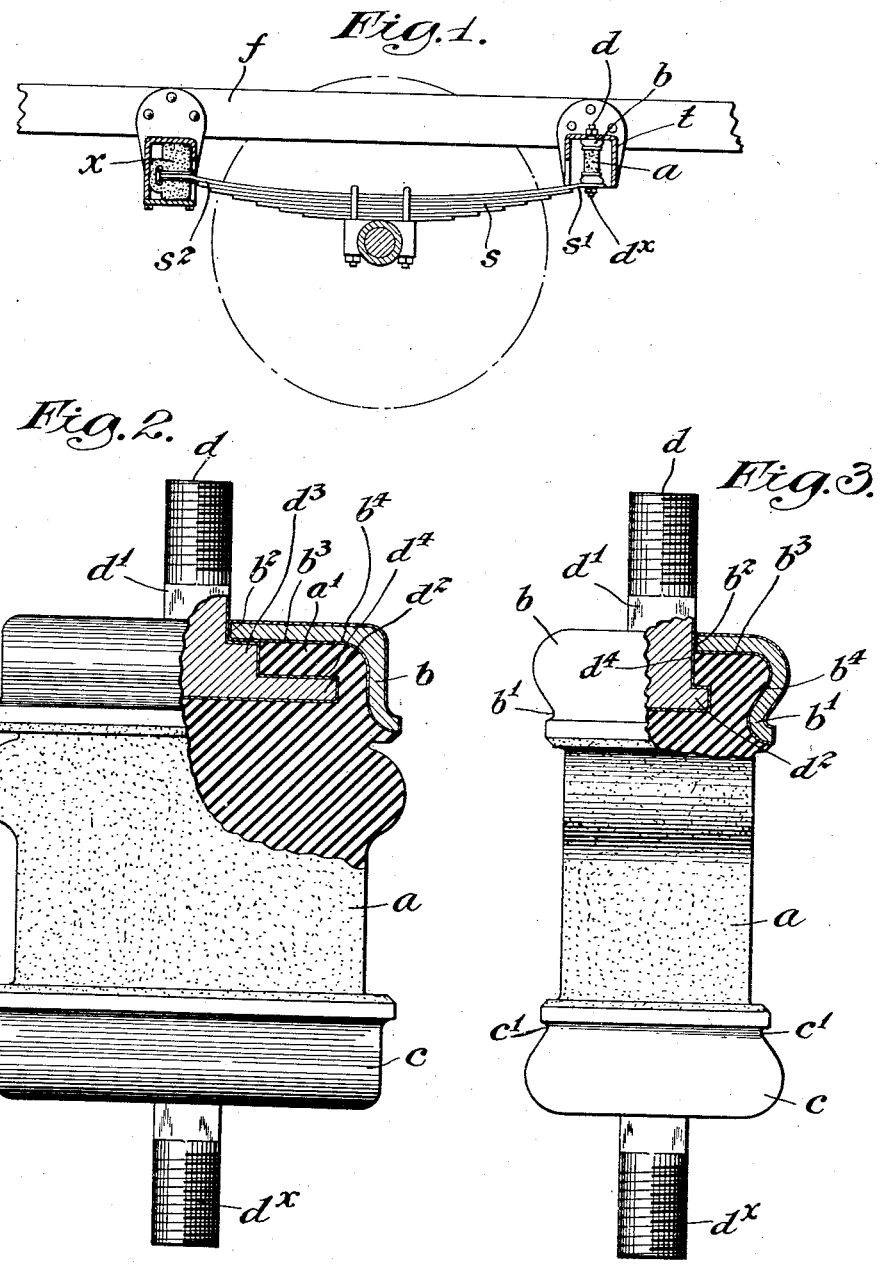
Inventor:
August H. Leipert
By his Attorneys
Redding, Greeley, O'Shea & Campbell Patented Mar. 3, 1931

1,794,780

UNITED STATES PATENT OFFICE

AUGUST H. LEIPERT, OF NEW YORK, N. Y., ASSIGNOR TO INTERNATIONAL MOTOR COMPANY, OF NEW YORK, N. Y., A CORPORATION OF DELAWARE

SPRING SUSPENSION

Application filed November 3, 1927. Serial No. 230,750.

This invention relates to spring suspensions of the kind in which the element to be supported is connected to the supporting element through yielding non-metallic material in such a manner as to entirely eliminate any metal to metal contact between the two. More particularly the invention is concerned with the provision of what may be termed a single column non-metallic compression shackle which may be used to connect one end of a spring of a motor vehicle, for instance, to the chassis frame, the other end of the spring being connected to the frame by any means which will hold that end pivotally fixed with respect to the frame.

Single column non-metallic compression shackles have been heretofore provided but it has generally been necessary to provide some reinforcing means for the non-metallic material, such as a chain or cable embedded in the non-metallic material and fastened at its ends to the frame and the spring. But it is proposed, according to this invention, to eliminate the use of such reinforcing means and thus provide a wholly non-metallic shackle. This is accomplished by so forming the seats in which the ends of the non-metallic material are confined, and by means of which the shackle is connected to the spring and frame, respectively, that the column of non-metallic material will be capable of yieldingly resisting all the strains for which reinforcing means were previously necessary. Accordingly the said seats are plated with brass or some other metal in order to provide a firmer bond between the metal and the non-metallic material, preferably rubber; and the bolts, which are provided to fix the seats to the frame and the spring, are formed with enlarged heads, disposed inside the seats, a portion of the heads being spaced from the inner surface of the seat so that the non-metallic material may flow thereunder during molding and thereby be firmly retained in the seats.

A preferred embodiment of the invention has been illustrated in the accompanying drawings to which reference should be had in connection with the following detailed description. In the drawings:

Figure 1 is a view of so much of a motor vehicle as is necessary to show the invention applied thereto;

Figure 2 is a view, partly in section, of a single column non-metallic shackle according to this invention; and Figure 3 is a side view, partly in section, of the shackle shown in Figure 2.

As shown in Figures 2 and 3 a block $a$ of yielding non-metallic material, as rubber, is adapted to be retained at its ends in metallic seats $b$ and $c$, respectively, the longer edges of the cups comprising the seats being pressed inwardly, as at $b'$ and $c'$, to assist in holding the non-metallic block in place under tension. Each seat is formed with a squared hole, as $b^2$, in which is disposed the squared shank $d'$ of a bolt $d$ the head of which is formed with an extended rim $d^2$ disposed within the seat but spaced from the inner surface $b^3$ thereof to allow a portion of the non-metallic material, as $a'$, to flow therebetween to further secure the end of the block in the seat. Shoulders, as $d^3$, are formed on the bolt and abut against the inner surface $b^3$ of the seat so that when the block is under tension stresses will be transmitted from the bolt to the seat and thence to the block of non-metallic material instead of being transmitted directly from the bolt to the non-metallic material. In order to provide a better bond between the metallic seats and bolts and the yielding non-metallic material the seats and bolts are coated with a thin layer of brass as indicated at $b^4$ and $d^4$.

The manner in which a single column yielding non-metallic shackle may be applied to the spring suspension of a motor vehicle, for instance, is illustrated in Figure 1. The seat $c$ is fixed to one end $s'$ of the spring $s$ by means of the bolt $d^x$ and the seat $b$ is fixed to a bracket $t$ carried with the chassis frame $f$, the block $a$ of yielding non-metallic material being retained between the seats as above set forth. In order to provide a pivotal point for the spring and so that driving torque may be transmitted therethrough, as in the case of vehicles employing the so-called Hotchkiss drive, the other end $s^2$ of the spring is retained in shackle $x$ of the regular well-known shock insulator type of the kind disclosed in Letters Patent No. 1,404,876 to Masury and Leipert, dated January 31, 1922, for instance, or in any other suitable manner.

It will be seen that the flat outer surfaces of the seats of the single column shackle herewith disclosed rest against the spring end and the bracket carried with the chassis, respectively, so that the weight of the chassis will be transmitted to the spring wholly through the compression of the non-metallic material. When the non-metallic material is under tension, as in the case of rebound, stresses will be transmitted between the members from the bolt heads to the seats and thus through the non-metallic material which yieldingly absorbs them and cushions the shock, the formation of the seats, the bond between the non-metallic material and the metallic seats and bolt heads, and the formation of the bolt heads within the seats jointly conducing to retain the block of non-metallic material within the seats.

Thus there has been provided a single column shackle for spring suspensions which is wholly non-metallic; which requires no reinforcements for the non-metallic material as in previous single column shackles; which yieldingly cushions and absorbs shocks to an extent possible only with a wholly non-metallic single column shackle; and which may be manufactured cheaply and easily.

No limitations upon the scope of the invention are intended except as indicated in the following claims.

I claim as my invention:

1. In a spring suspension for a vehicle, a wholly non-metallic single column shackle therefor, comprising a plurality of seats adapted to be fixed to the spring end and to the chassis frame, respectively, and a block of yielding wholly non-metallic material retained at its ends in the seats, said seats being coated with a thin layer of rust-proof metal to insure a solid bond between the metallic and non-metallic materials.

2. In a spring suspension for a vehicle, a wholly non-metallic single column shackle therefor, comprising a plurality of seats, a hole in each seat, a bolt having the head disposed in the seat and the shank passing through said hole, whereby the seats may be fixed to the spring end and to the chassis frame, respectively, and a block of yielding wholly non-metallic material retained at its ends in the seats, said seats and bolts being coated with a thin layer of rust-proof metal to insure a solid bond between the metallic and non-metallic materials, and said bolt heads being formed with rims spaced from the inner surfaces of the seats to provide space for the yielding non-metallic material to retain it in the seats.

3. In a spring suspension for a vehicle, a wholly non-metallic single column shackle therefor, comprising a plurality of seats, a hole in each seat, a bolt having the head disposed in the seat and the shank passing through said hole, whereby the seats may be fixed to the spring end and to the chassis frame, respectively, and a block of yielding wholly non-metallic material retained at its ends in the seats, said seats and bolts being coated with a thin layer of rust-proof metal to insure a solid bond between the metallic and non-metallic materials, said bolt heads being formed with rims spaced from the inner surfaces of the seats to provide space for the yielding non-metallic material to retain it in the seats, and two opposed sides of each seat being pressed inwardly to further aid in retaining the ends of the non-metallic block within the seats.

4. In a spring suspension for a vehicle, a wholly non-metallic single column shackle therefor, comprising a plurality of seats, a hole in each seat, a bolt having the head disposed in the seat and the shank passing through said hole, whereby the seats may be fixed to the spring end and to the chassis frame, respectively, and a block of yielding wholly non-metallic material retained at its ends in the seats, said seats and bolts being coated with a thin layer of rust-proof metal to insure a solid bond between the metallic and non-metallic materials, two opposed sides of each seat being pressed inwardly to aid in retaining the ends of the non-metallic block within the seats, said bolt heads being formed with rims spaced from the inner surfaces of the seats to provide space for the yielding non-metallic material to further aid in retaining it in the seats, and each bolt being formed with a shoulder abutting inwardly against a side of each seat.

5. As an article of manufacture, a wholly non-metallic single column shackle for a spring suspension comprising a block of wholly non-metallic yielding material having its ends confined in metallic seats, said seats having depressed sides and having disposed therein bolt heads formed with rims spaced from the inner surface of the seats providing space for the non-metallic material between the bolt head and the seat and the seats and bolt heads being coated with rust-proof metal, whereby the ends of the non-metallic block will be firmly retained in the seats, the shanks of the bolts projecting through the seats.

This specification signed this 1st day of November, A. D. 1927.

AUGUST H. LEIPERT.